(12) United States Patent
Albou et al.

(10) Patent No.: US 11,572,993 B2
(45) Date of Patent: Feb. 7, 2023

(54) LIGHT MODULE FOR MOTOR VEHICLE HEADLAMP

(71) Applicant: VALEO VISION, Bobigny (FR)

(72) Inventors: Pierre Albou, Bobigny (FR); Thomas Daniel, Bobigny (FR); Sophie Clade, Bobigny (FR); Sebastien Roels, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 17/273,984

(22) PCT Filed: Sep. 10, 2019

(86) PCT No.: PCT/EP2019/074067
§ 371 (c)(1),
(2) Date: Mar. 5, 2021

(87) PCT Pub. No.: WO2020/053192
PCT Pub. Date: Mar. 19, 2020

(65) Prior Publication Data
US 2021/0356091 A1    Nov. 18, 2021

(30) Foreign Application Priority Data

Sep. 12, 2018 (FR) ...................................... 1858178

(51) Int. Cl.
*F21S 41/00* (2018.01)
*F21S 41/153* (2018.01)
(Continued)

(52) U.S. Cl.
CPC ............. *F21S 41/153* (2018.01); *F21S 41/30* (2018.01); *F21S 45/40* (2018.01); *G02B 5/003* (2013.01);
(Continued)

(58) Field of Classification Search
CPC .... G03B 21/2033; F21S 45/40; F21S 41/153; F21S 41/30; G02B 5/003; G02B 5/005
See application file for complete search history.

(56) References Cited

U.S. PATENT DOCUMENTS 10,323,814 B2 * 6/2019 Yagi ...................... F21S 41/365
10,371,335 B2 * 8/2019 Zorn ....................... F21S 41/24
(Continued)

FOREIGN PATENT DOCUMENTS

AT            11129 U1    5/2010
DE    202016103287 U1    7/2016
(Continued)

OTHER PUBLICATIONS

European Patent Office, International Search Report (w/English translation) and Written Opinion of International Application No. PCT/EP2019/074067, dated Nov. 6, 2019.

*Primary Examiner* — Gerald J Sufleta, II
(74) *Attorney, Agent, or Firm* — Valeo Vision

(57) ABSTRACT

A light module for a motor vehicle headlamp comprising at least one pixelated light source, a plurality of electroluminescent emitters distributed into a plurality of pixels and capable of emitting light rays, a projection optic arranged to directly image, toward the outside of the light module, a light beam formed by said light rays emitted by said at least one light source. The light module is characterized by a mask arranged between the at least one light source and the projection optic in order to completely or partially prevent light rays originating from the light source from being reflected by regions arranged outside the plurality of electroluminescent emitters of the light source.

15 Claims, 4 Drawing Sheets

(51) Int. Cl.
*F21S 41/30* (2018.01)
*F21S 45/40* (2018.01)
*G02B 5/00* (2006.01)
*G03B 21/20* (2006.01)
*F21Y 115/10* (2016.01)

(52) U.S. Cl.
CPC ....... *G03B 21/2033* (2013.01); *F21Y 2115/10* (2016.08)

(56) References Cited

U.S. PATENT DOCUMENTS

| | | | | |
|---|---|---|---|---|
| 2008/0158892 | A1* | 7/2008 | Davis | G02B 5/003 |
| | | | | 362/362 |
| 2009/0244921 | A1* | 10/2009 | Saida | H01L 33/58 |
| | | | | 362/545 |
| 2012/0188431 | A1* | 7/2012 | Takimoto | H01L 27/14818 |
| | | | | 348/311 |
| 2014/0063833 | A1* | 3/2014 | Park | F21S 41/143 |
| | | | | 362/520 |
| 2014/0146553 | A1* | 5/2014 | Hering | F21S 41/155 |
| | | | | 362/509 |
| 2017/0130924 | A1* | 5/2017 | Kawai | F21S 41/148 |
| 2017/0274254 | A1* | 9/2017 | Mori | A63B 69/3685 |
| 2017/0297479 | A1* | 10/2017 | Debert | F21S 41/141 |
| 2019/0154226 | A1* | 5/2019 | Choquet | F21S 45/10 |
| 2019/0195459 | A1* | 6/2019 | Reisinger | G02B 26/0833 |
| 2019/0278181 | A1* | 9/2019 | Deng | H01L 27/1262 |

FOREIGN PATENT DOCUMENTS

| | | |
|---|---|---|
| EP | 2827049 A2 | 1/2015 |
| EP | 3173688 A1 | 5/2017 |

\* cited by examiner

LIGHT MODULE FOR MOTOR VEHICLE HEADLAMP

CROSS-REFERENCE TO RELATED APPLICATIONS

This is a 371 application (submitted under 35 U.S.C. § 371) of International Application No. PCT/EP2019/074067 (WO2020053192) filed on Sep. 10, 2019, which claims priority date benefit to French Application No. FR1858178 filed 12 Sep. 2018, the disclosures of which are incorporated herein by reference in their entirety.

TECHNICAL FIELD

The invention relates to a light module for a motor vehicle headlamp. The invention also relates to a motor vehicle headlamp and to a motor vehicle comprising such a light module.

Headlamps for motor vehicles that allow information to be displayed on the lit surface are known. Such a headlamp generally comprises a light-emitting device comprising a multipixel monolithic light source in order to display an image. An optical device is mounted on the light-emitting device, and comprises a projection system in order to guide the light beams originating from each pixel of the multipixel light source. However, it is difficult to obtain an image of good quality at the output of the optical device, due to the presence of stray reflections, which blur the image ultimately projected.

BACKGROUND

The object of the invention is to provide a light module with a multipixel light source for a motor vehicle headlamp that allows the quality of the projected beam to be optimized.

In particular, the invention makes it possible to produce a light module generating a projected image that is sharper and less noisy than the images generated by the devices of the prior art.

SUMMARY

To that end, the invention relates to a light module for a motor vehicle headlamp characterized in that it comprises:
  at least one pixelated light source comprising a plurality of electroluminescent emitters distributed into a plurality of pixels and capable of emitting light rays;
  a projection optic arranged to directly image, toward the outside of the light module, a light beam formed by said light rays emitted by said at least one light source, and characterized in that it comprises
  a mask arranged between the at least one light source and the projection optic in order to completely or partially prevent light rays originating from the light source from being reflected by regions arranged outside the plurality of electroluminescent emitters of the light source.

The light module may further comprise a printed circuit board, connected to said light source by at least one electrical connection attached to at least one connection track of the light source, said mask comprising an opening so as to allow the light beam originating from the light source to pass and to at least partially cover the at least one electrical connection and/or the at least one connection track and/or the printed circuit board.

The mask may at least partially cover all of the electrical connections and connection tracks of the light source, in particular cover all parts of each electrical connection that are positioned above the printed circuit board and at least part of each electrical connection that is positioned above the light source.

The electrical connections may consist of links that are attached, respectively, to the surfaces of a printed circuit board and of the light source that are oriented on the projection optic-side.

The mask may be attached to a printed circuit board or to a base to which a printed circuit board and/or the light source is attached, or wherein the mask is attached to the projection optic.

The surface of the mask that is oriented toward the projection optic may have a reflectance of lower than 25%, or lower than 20%, preferably lower than 5%.

The mask may be made of an electrically conductive material, in particular is made of metal or metal alloy, preferably aluminum or aluminum alloy.

The mask may be separated from the light source by a distance of between 0.2 mm and 5 mm, preferably between 0.2 mm and 1.5 mm.

The mask may be electrically connected to a ground.

The light module may further comprise a cooling plate arranged directly or indirectly against the light source on the side opposite the projection optic in order to cool said light source, said cooling plate being optionally connected to a cooling device such as a thermal radiator.

The cooling plate may be arranged so that the upper surface of the printed circuit board is substantially flush with the upper surface of the light source.

The projection optic may comprise at least one projection system arranged so as to project the image generated by the light source.

The invention also relates to a headlamp for a motor vehicle comprising a light module such as described above.

The invention also relates to a light device for a motor vehicle, such as a headlamp, a rear light or else an interior light unit for the passenger compartment of a vehicle, comprising a light module such as described above.

Lastly, the invention also relates to a motor vehicle comprising a headlamp such as defined above.

BRIEF DESCRIPTION OF THE DRAWINGS

These objects, features and advantages of the present invention will be explained in detail in the following description of one particular embodiment provided without limitation with reference to the accompanying figures, in which.

DETAILED DESCRIPTION

Figure 1:
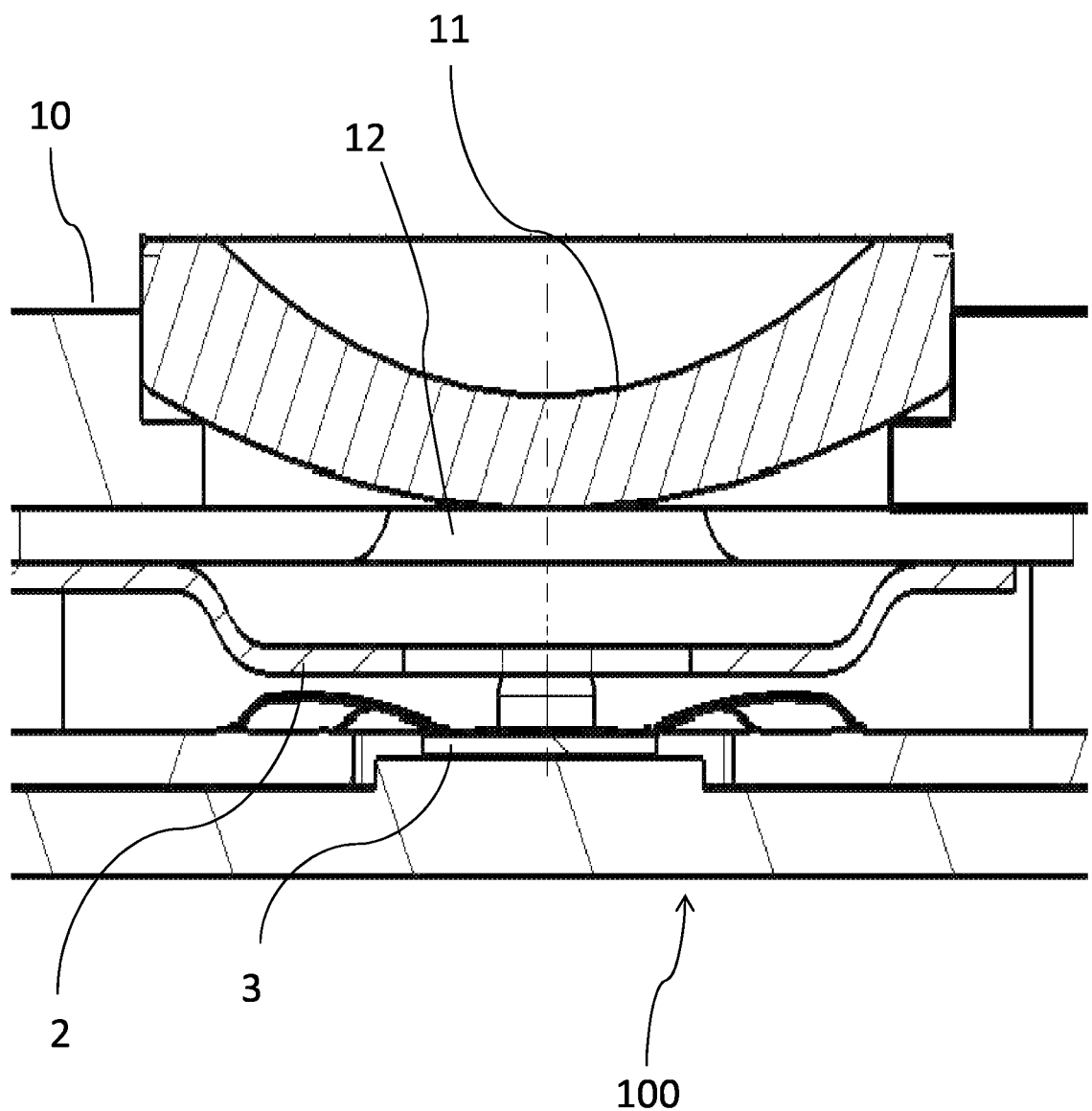
FIG. 1 shows a sectional view of a light module according to one embodiment of the invention.

FIG. 1 schematically shows light module 100 according to one embodiment of the invention. Light module 100 firstly comprises a light-emitting device 1, which will be more particularly described by reference to FIG. 2, which comprises in particular at least one multipixel or pixelated light source 3. More precisely, the light module comprises a pixelated light source comprising a plurality of electroluminescent emitters distributed into a plurality of pixels and capable of emitting light rays forming a light beam. The light module 100 further comprises an optical device comprising in particular a projection optic 10 with an entrance surface 12, in order to guide the beams generated by the light-emitting device 1 toward the outside, and a mask 2 interposed between the light-emitting device 1 and the optical device, more precisely the projection optic 10.

Mask 2 advantageously makes it possible to absorb at least some of the stray light rays, for example reflected by the optical device then the light-emitting device, as will be described below.

Figure 2:
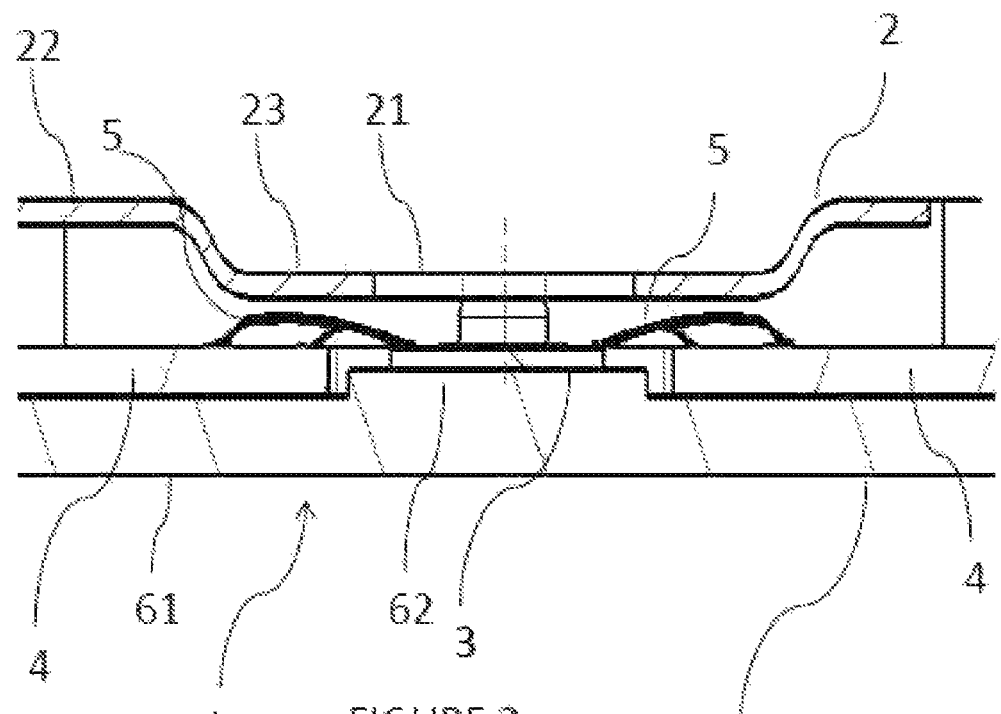
FIG. 2 shows a sectional view of the light-emitting device of the light module according to one embodiment of the invention.
Figure 3A:
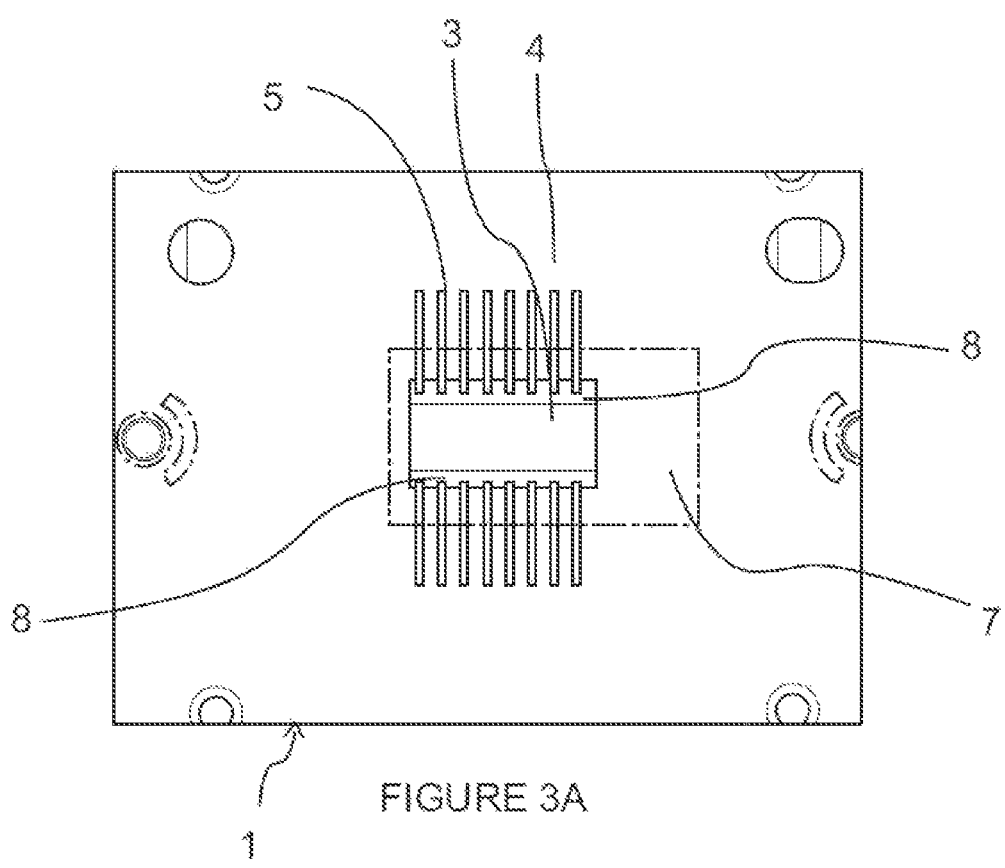
FIG. 3A shows a view from above of the light-emitting device without a mask of the light module according to the embodiment of the invention.

Light-emitting device 1 according to the embodiment is described below with reference to FIG. 2 and FIGS. 3A and 3B.

Light-emitting device 1 comprises a pixelated light source 3, i.e. it comprises an array of elementary light sources forming an array of pixels. The light source 3 further comprises a support 7, which may be in the form of a base made of aluminum, on which the array of light sources is arranged. It also comprises connection tracks 8 in order to supply the array of elementary light sources with power.

Light source 3 is preferably a monolithic light source. What is meant by monolithic is that each pixel emits light in one direction. The light beam from each pixel is therefore rectilinear. This effect thus makes it possible to ensure that the light emitted by a pixel will not overlap with the light emitted by an adjacent pixel.

The pixelated and monolithic light source may thus project an image onto a support located a sufficiently long distance away from the light module. The light source 3 may also be designed so that the light beam comprising all of the light rays emitted by each pixel is cylindrical.

Light source 3 may comprise an array of light-emitting diodes in order to form the pixels, also called a pixelated LED. Preferably, the light source 3 comprises a number of pixels that is between 200 and 10000 pixels, preferably between 2000 and 6000 pixels. As a variant, this light source could be an array of micro-mirrors, which takes the form of a microelectromechanical system comprising a multitude of micro-mirrors which are all movable about the same axis and which may take at least two distinct orientations. According to its first orientation, a micro-mirror transmits a light ray out of the light module, inside a lighting field. According to its second orientation, the light ray is deflected out of the lighting field. The orientation of each micro-mirror may be controlled individually under the effect of an electrostatic force. Such an array of micro-mirrors makes it possible to obtain a much higher number of pixels.

Light-emitting device 1 further comprises a printed circuit board 4. The printed circuit board 4 is arranged so as to be able to control the light source 3. It comprises an opening within which the light source 3 is arranged.

In the embodiment, light source 3 is connected to the printed circuit board 4 by electrical connections 5 that are arranged so as to electrically connect the connection tracks 8 of the light source 3 to the printed circuit board 4.

According to the embodiment, at least one electrical connection 5 may comprise a solder wire. The solder wire may be, without limitation, made of aluminum or gold or of tin or any other alloy based on at least one aforementioned metal. Because of its composition, such an electrical connection 5 is therefore reflective. There is therefore a risk of the electrical connection 5 reflecting light rays that could be reflected by the optical device and then returned to the light-emitting device 1. The presence of mask 2 makes it possible to prevent at least some, preferably all, of the electrical connections 5 from receiving and reflecting such stray rays.

As illustrated by FIG. 1, the light-emitting device is intended to cooperate with an optical device. The latter comprises an optical projection system 11, which creates a real and possibly anamorphic image of part of the device, for example the source itself or a shield, or of an intermediate image of the source, at a (finite or infinite) distance that is very large in comparison with the dimensions of the device (of a ratio of the order of at least 30, preferably 100) of the device. The projection system may consist of one or more reflectors, or else of one or more lenses, or one or more light guides, or indeed of a combination of these possibilities.

The optical device includes an entrance surface 12 that comprises an anti-reflective coating. Despite such an anti-reflective coating, the optical device still reflects a small portion of the light beam originating from the light source 3 toward the light-emitting device 1. This effect generates unwanted stray light rays, which degrade the image projected by the light module if they exit the light module. More specifically, the optical device comprises a projection optic 10 for projecting the light emitted by the semiconductor light source. This projection optic ultimately creates a real and possibly anamorphic image of part of the device, for example the source itself or a shield, or of an intermediate image of the source. This image is very large in size with respect to the dimensions of the light module and of the light source (with a ratio of the order of at least 30, preferably at least 100). This projecting optic may consist of one or more reflectors, or else of one or more lenses, or one or more light guides, or indeed of a combination of these possibilities.

To decrease this effect of the projected image being degraded by the reflected stray light rays, the light module 100 further comprises a mask 2 arranged between the light-emitting device 1 and the optical device. This mask 2 is designed and arranged to prevent at least some of the rays reflected by the optical device from being reflected a second time by the light source 3, in particular by the electrical connections 5, the connection tracks 8, the support 7, or even the printed circuit board 4. The mask 2 thus prevents all or some stray light emission out of the light module 100, which emission could be emitted by reflection by regions arranged outside the at least one light source 3, and in particular outside the plurality of electroluminescent emitters.

According to the embodiment, the mask 2 comprises an opening 21 allowing the passage of the monolithic rays originating from the light source 3, in order to allow them to reach the optical device. The shape and size of this opening 21 are preferably very close to those of the light source 3. It preferably comprises an outline of the same shape as the outline of the light source 3, so as to allow only the light rays emitted by this light source 3 to pass.

Mask 2 further comprises a surface 22, oriented toward the optical device, which is anti-reflective and arranged so as to cover at least part of the printed circuit board 4 and/or at least part of the electrical connections 5. As illustrated in FIG. 3B, the anti-reflective surface covers a large part of the printed circuit board 4 and of the at least one electrical connection 5 of the light-emitting device 1. Advantageously, the mask 2 covers all of the electrical connections 5, including all of their parts that are positioned above the printed circuit board 4 and at least one of their parts that are positioned above the light source 3. Again advantageously, the surface of the mask 22 oriented toward the optical device has a reflectance of lower than 25%, or lower than 20%, preferably lower than 5%.

At least some of the rays reflected by the optical device and directed toward the printed circuit board 4 and/or the at least one electrical connection 5 are thus absorbed and will not "interfere" with the light beam originating from the light module 100.

Mask 2 is arranged above the printed circuit board 4, the at least one electrical connection 5 and the light source 3 so as not to be in contact with the printed circuit board 4 and/or with the at least one electrical connection 5. It is advantageously arranged as close as possible to the light source 3. However, the presence of the electrical connections 5 in relief require it to be positioned slightly above these electrical connections 5, and thus above the light source 3, preferably within 0.5 mm of the emission plane of the light source 3, or at a distance of between 0.2 mm and 5 mm, preferably between 0.2 mm and 1.5 mm.

Mask 2 is preferably made of a thermally conductive material in order to dissipate the heating experienced due to the proximity of the light source 3. In addition, the mask 2 is advantageously made of electrically conductive materials and is connected to a ground in order to avoid the formation of an electric arc between the mask 2 and at least one connection track 5.

Preferably, the mask 2 is thus made of a conductive metal such as of aluminum or of an aluminum alloy.

Advantageously, mask 2 comprises a thickness of less than 2 mm, less than 1 mm or less than 0.5 mm. When the thickness of the mask 2 is less than or equal to 0.5 mm, the cooling of the mask 2 by heat exchange with the air is optimized.

In the embodiment, mask 2 comprises a protruding part 23 that protrudes, in its central region, in a direction closer to the light source 3. This protruding part 23 forms a relief that is different from the rest of the mask 2. The peripheral parts of the mask serve in particular for its attachment. In addition, the exchange of heat between the air and the mask 2 in the non-protruding part is thus favored. In one embodiment, the mask 2 is mounted on the light-emitting device 1, either by attachment to the printed circuit board 4, or to a base on which the printed circuit board is mounted. Advantageously, the mask is attached to the same component as that which bears the light source 3. In an alternative embodiment, the mask 2 is mounted on the optical device.

Figure 3B:
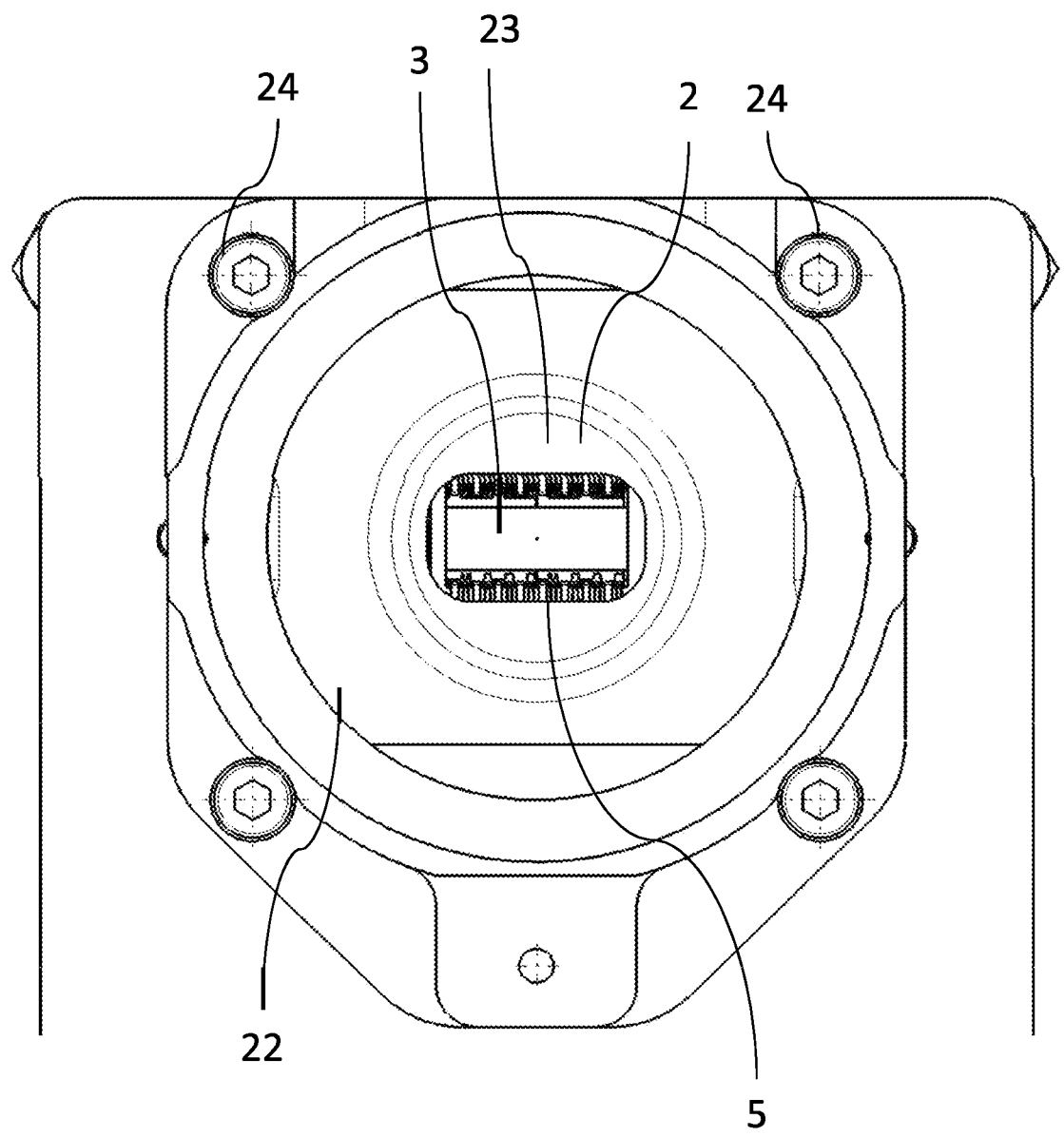
FIG. 3B shows a view from above of the light-emitting device with a mask of the light module according to the embodiment of the invention.

As illustrated by FIG. 3B, mask 2 may be machined so as to comprise at least one attachment element 24 in order to cooperate with the light-emitting device 1 and/or with the optical device. This at least one attachment element 24 may comprise a bore or a threaded hole.

Figure 4:
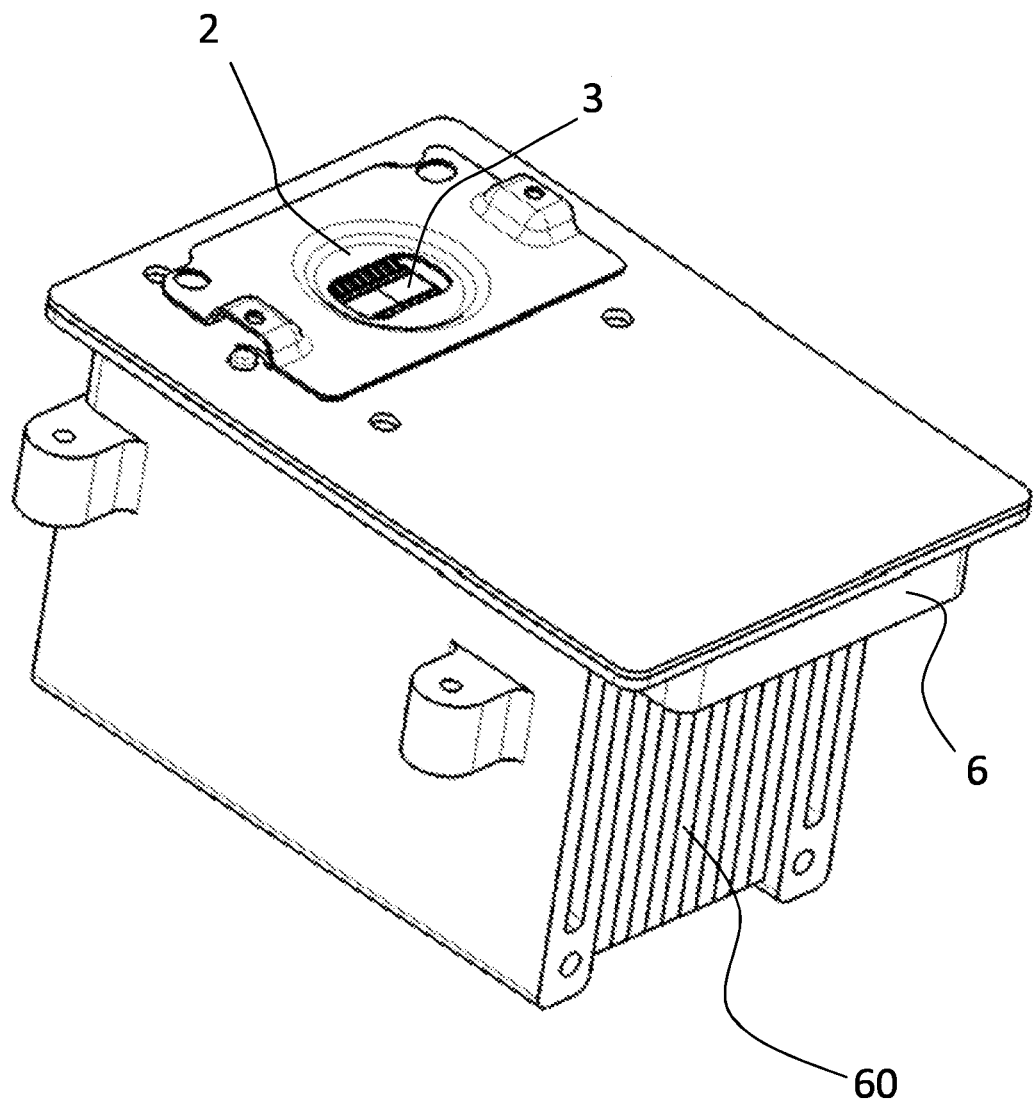
FIG. 4 shows a perspective view of part of the optical module according to the embodiment of the invention.

Furthermore, in the embodiment of the invention, the light-emitting device 1 comprises a cooling device. This cooling device is designed to cool the light-emitting device. It comprises a base 6 made of thermally conductive material. The free surface 61 of this base 6 is in contact with a thermal radiator 60, visible in FIG. 4, and/or with a heat exchanger so as to remove the heat produced by the light source.

In one embodiment, the thermal conductor base 6 comprises a central part comprising a protrusion 62 to which the light source 3 is directly attached. This arrangement facilitates the removal of the heat generated by light source 3.

The protrusion 62 also allows the light source 3 to be raised. Thus, it is designed so that the surfaces of the light source and of the printed circuit board 4 that are oriented toward the optical device, more precisely toward the projection optic, are substantially at the same height, and in any case at a respective height which optimizes their electrical connection via the electrical connections 5. What is meant here by substantially at the same height is that the difference in height between the two surfaces is smaller than 2 mm, preferably smaller than 1 mm.

The thermal conductor base 6 is arranged so that the upper surface of the printed circuit board 4 is substantially flush with the upper surface of the light source 3.

The invention also relates to a headlamp comprising a light module 100 such as described above. It also relates to a vehicle, such as a motor vehicle, comprising said headlamp.

What is claimed is:

1. A light module of a motor vehicle headlamp, characterized in that the light module comprises:
    at least one pixelated light source comprising a number of electroluminescent emitters distributed into a plurality of pixels and capable of emitting light rays;
    a projection optic arranged to direct an image toward an outside of the light module;
    a light beam formed by said emitting light rays from said pixelated light source, and characterized in that the light module includes
    a mask arranged between said pixelated light source and the projection optic in order to prevent a portion of light rays originating from said pixelated light source from being reflected by regions arranged outside said electroluminescent emitters,
    wherein the mask is made of an electrically conductive material,
    wherein the mask covers at least one connection track of said pixelated light source by particularly covering a portion of a number of electrical connections that are positioned above said pixelated light source,
    wherein the mask is separated from said pixelated light source by a distance of between 0.2 mm and 5 mm.

2. The light module of claim 1, further comprising a printed circuit board connected to said pixelated light source by at least one electrical connection attached to at least one connection track of said pixelated light source, said mask comprising an opening so as to allow the light beam originating from said pixelated light source to pass and to at least partially cover said electrical connection or said connection track or the printed circuit board.

3. The light module of claim 1, wherein the mask covers the at least one connection track of said pixelated light source positioned above a printed circuit board and each said electrical connection positioned above said pixelated light source.

4. The light module of claim 2, wherein said electrical connection consists of links that are attached to a number of surfaces of said printed circuit board, respectively, and of said pixelated light source that is oriented on a side of the projection optic.

5. The light module of claim 1, wherein the mask is attached to a printed circuit board or to a base to which said printed circuit board or said pixelated light source is attached, or wherein the mask is attached to the projection optic.

6. The light module of claim 1, wherein a surface of the mask that is oriented toward the projection optic has a light reflectance of lower than 25%.

7. The light module of claim 1, wherein the mask is made of a metal or a metal alloy that includes aluminum or an aluminum alloy.

8. The light module of claim 1, wherein the mask is electrically connected to a ground circuit.

9. The light module of claim 1, further comprising a cooling plate arranged directly or indirectly against said pixelated light source on an opposing side of the projection optic in order to cool said pixelated light source, the cooling plate adapted to connect to a cooling device or a thermal radiator.

10. The light module of claim 2, further including a cooling plate arranged against said pixelated light source on an opposing side of the projection optic in order to cool said pixelated light source,
the cooling plate adapted to connect to a cooling device or a thermal radiator, wherein the cooling plate is arranged so that an upper surface of the printed circuit board is substantially flush with an upper surface of said pixelated light source.

11. The light module of claim 1, wherein the projection optic includes at least one projection system arranged so as to project the image generated by said pixelated light source.

12. A headlamp of a motor vehicle comprising a light module of claim 1.

13. The light module of claim 1, wherein the mask is separated from said pixelated light source by a distance of between 0.2 mm and 1.5 mm.

14. The light module of claim 1, wherein a surface of the mask that is oriented toward the projection optic has a light reflectance of lower than 5%.

15. A light module of a motor vehicle headlamp, characterized in that the light module comprises:
   at least one pixelated light source comprising a number of electroluminescent emitters distributed into a plurality of pixels and capable of emitting light rays;
   a projection optic arranged to direct an image toward an outside of the light module;
   a light beam formed by said emitting light rays from said pixelated light source, and characterized in that the light module includes
   a mask arranged between said pixelated light source and the projection optic in order to prevent a portion of light rays originating from said pixelated light source from being reflected by regions arranged outside said electroluminescent emitters, wherein the mask is made of an electrically conductive material;
   wherein the mask covers a portion of at least one electrical connection and at least one connection track of said pixelated light source by particularly covering all parts of each said electrical connection that is positioned above a printed circuit board and at least a portion of each said electrical connection that is positioned above said pixelated light source;
   wherein the mask is electrically connected to a ground circuit; and
   wherein the mask is separated from said pixelated light source by a distance of between 0.2 mm and 5 mm.

* * * * *